April 17, 1962

J. HAGEMANN 3,030,050

AUTOMATIC STABILIZATION OF OBJECTS SUSPENDED
FROM AN UNSTABLE PLATFORM

Filed March 14, 1961

Julius Hagemann
*INVENTOR.*

BY

*ATTORNEY.*

Julius Hagemann
INVENTOR.

3,030,050
AUTOMATIC STABILIZATION OF OBJECTS SUSPENDED FROM AN UNSTABLE PLATFORM
Julius Hagemann, 412 S. MacArthur Ave.,
Panama City, Fla.
Filed Mar. 14, 1961, Ser. No. 95,753
7 Claims. (Cl. 244—3)
(Granted under Title 35, U.S. Code (1952), sec. 266)

The invention described herein may be manufactured and used by or for the Government of the United States of America for governmental purposes without the payment of any royalties thereon or therefor.

The present invention relates to rapid acting motion compensating apparatus and more particularly to the automatic stabilization with respect to a horizontal reference plane of an object suspended from a platform subject to vertical motions relative to the reference plane.

The preferred embodiments to be described in detail are specially adapted for use in connection with the suspension of an object from a hovering or slowly moving rotary wing aircraft for the purpose of maintaining the object at a selected vertical separation from a reference plane such as the surface of the earth or for soft-landing or off-loading suspended objects on the surface of the earth or on the deck of a boat in a heavy sea. Because of the inherent instability of a rotary wing aircraft, it requires the constant attention of the pilot to control its flight and particularly in the control of hovering flight. An automatic pilot primarily serves to help maintain stability and does not relieve the human pilot of the primary duty of maintaining altitude and in spite of the efforts of both pilots sudden changes in the supporting property of the air, e.g., gusts of wind, bring about changes in altitude which are too abrupt for the pilot to counteract.

The present invention provides an object suspension system for hovering aircraft in which a height sensing device packaged with the suspended object derives an error signal corresponding to its departure from a preselected height, such error signal being employed to control a servo motor driving a winch on which the suspension cable is wound and unwound. With such a system, comparatively slow and smooth vertical position changes of the aircraft can be equalized as they occur.

It is therefore an object of the invention to provide for the vertical stabilization of an object suspended from a hovering aircraft.

Another object of the present invention is to provide a control arrangement for rapidly altering the effective length of an object suspending cable to compensate for the transient changes in the altitude of the supporting aircraft.

A further object of the invention is the provision of such a compensating arrangement which restores itself to a neutral position after each compensating cycle.

Other objects and advantages of the invention will become evident from the following description of preferred embodiments of the invention. The invention itself will be best understood from the following description when read in connection with the accompanying drawing and its scope is pointed out in the appended claims.

Figures 1, 4:
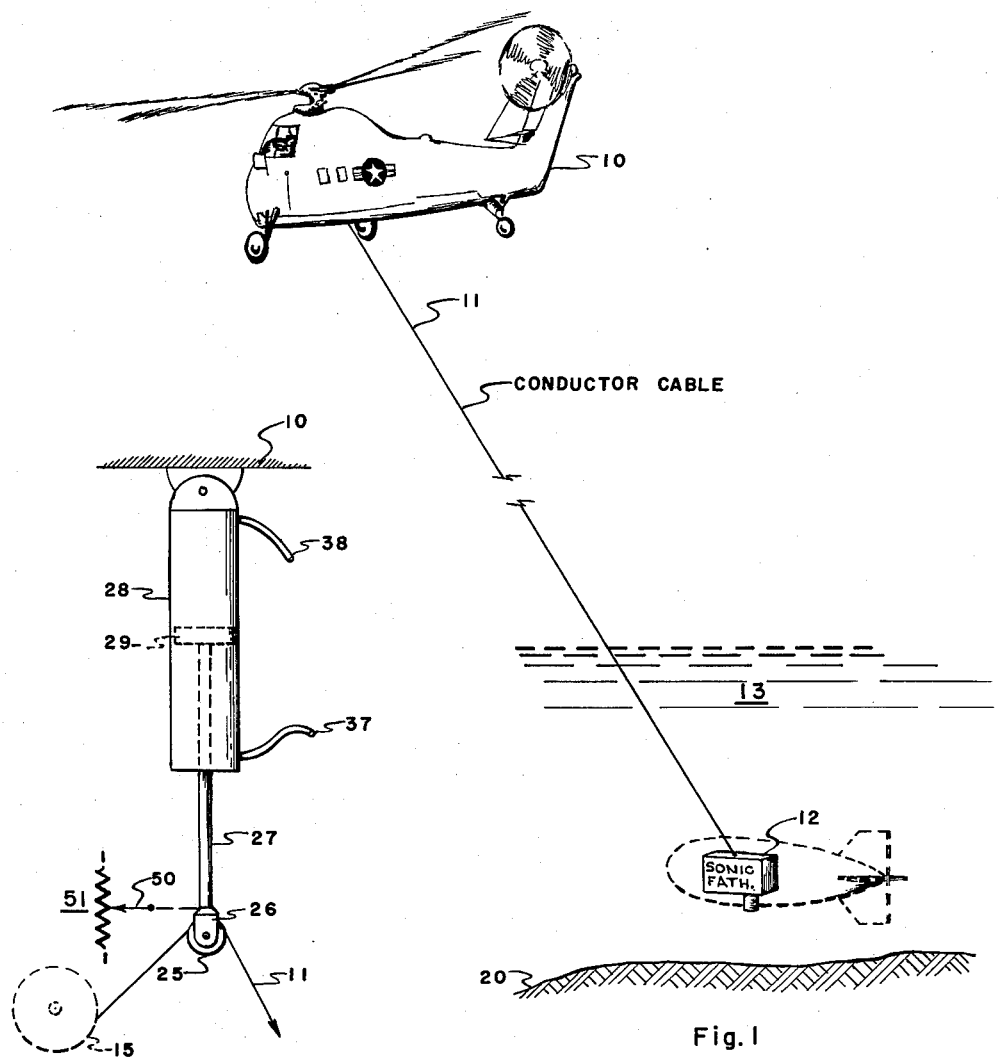
FIG. 1 is a conventionalized showing of an aircraft supporting a water submerged device above the water bed.
FIG. 4 shows a modified arrangement of one component utilized in the invention.

As shown in FIG. 1 an aircraft 10 has suspended therefrom a conductor cable 11 with an instrumented device 12 supported thereby submerged in a body of water 13, the cable being lowered through an opening in the floor of the aircraft 10 during hovering or slow flight operation. The device 12 has packaged therein a distance-from-the-bottom sensing apparatus which operates a suitable controller to regulate the length of the suspended cable 11 so as to maintain the device 12 at a preselected height above the bottom. Apparatus competent for accomplishing the foregoing under average operating conditions preferably are comparatively slow acting and function satisfactorily in equalizing smooth vertical position changes of the supporting aircraft 10. Under adverse operating conditions, sudden or abrupt changes can occur and result in undesirable changes in the vertical position of the device 12. Supplemental apparatus, to be described below, for compensating such sudden or abrupt changes senses acceleration of the aircraft 10 in the vertical direction and responds thereto in such a manner as to produce rapid changes in the effective length of the cable 11 so as to prevent any substantial vertical movement of the device 12.

Figure 2:
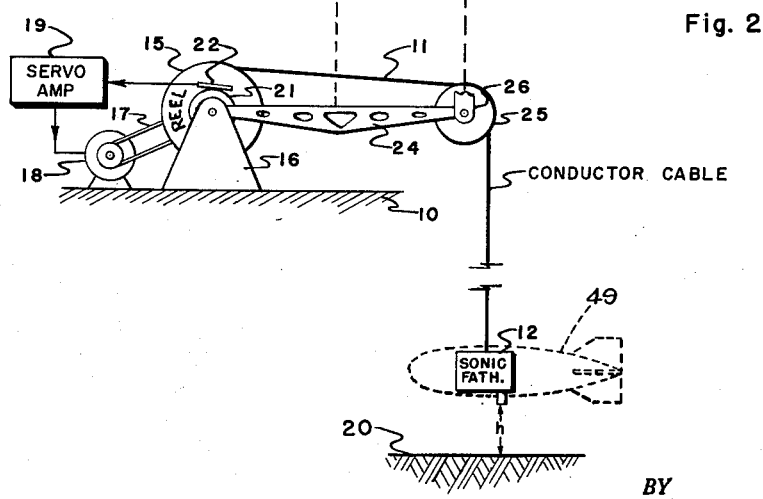
FIG. 2 is a schematic showing of the stabilizing and compensating control systems.

A preferred form of the invention to be described in detail in connection with FIG. 2 is shown mounted in the aircraft 10, designated a helicopter, provided with a conductor cable reel 15 journaled in a base 16 and adapted to be rotated in either direction through a belt 17 by a motor 18 as controlled by a servo amplifier 19 whose signal input corresponds to the distance $h$ the device 12 is spaced from a reference plane 20, here indicated as being the earth. Such signal input representative of the distance $h$ is derived by the ranging apparatus, such as a sonic fathometer, in the device 12 and is transmitted to the servo amplifier 19 via the conductor in the cable 11, a slip ring 21 connected thereto and a brush 22. The apparatus thus far described in connection with FIG. 2 wherein the conductor cable 11 is suspended directly from the reel 15 as in an ordinary hoisting winch comprises an adaptation of the bottom following servomechanism disclosed in my copending application Serial No. 753,166 filed August 4, 1958, for Facsimile Recording of Sonic Values of the Ocean Bottom. According to such adaptation the sonic fathometer in the device 12 produces an error signal corresponding to the departure of the distance $h$ from a preselected value which error signal is utilized by the servo amplifier 19 and the motor 18 to rotate the reel 15 until the error signal is nulled.

The rapid acting supplemental compensating means according to the invention as shown in FIG. 2 comprises in combination with the above described automatic control of the reel 15 a lever arm 24 pivotally mounted coaxially with the reel 15 and carrying at its distal end a dance pulley 25 rotatably mounted in a block 26 to which is secured the piston rod 27 of a hydraulic cylinder 28 connected between the aircraft 10 and the pulley 25 and having a piston 29. In its stable position the arm 24 is substantially horizontal with the piston 29 midway its stroke in the cylinder 28. A control valve 31 of known structure interposed between the cylinder 28 and a source of hydraulic pressure 32 serving a pressure line 33 and a return line 34 includes a movable element 35 for regulating the distribution of liquid in the cylinder 28 on opposite sides of the piston 29 for raising and lowering the piston 29. The element 35 of the valve 31 is movable from its neutral position (as shown) upward or downward by the action of a double wound solenoid 30 on an armature 36 connected to the movable valve element 35. In its neutral position the valve element 35 isolates the cylinder 28 from the pressure source 32 and the piston 29 is held stationary. Upward movement of the valve element 35 places the lower portion of the cylinder 28 in communication with the pressure line 33 via a conduit 37 and the upper portion in communication with the return line 34 via a conduit 38 thereby moving the piston 29 in an upward direction. Downward movement of the valve element 35 from its neutral position reverses the above connections to move the piston 29 in a downward direction. It will be evident that the up and down movement of the piston 29 and the pulley 25 supported thereby effectively shortens and lengthens, respectively, the suspended cable 11 which action can compensate for equal and opposite movements of the aircraft 10. The solenoid armature 36 and its connected valve element 35 are yieldably supported in neutral position in any suitable manner as by a spring 39 anchored to the aircraft 10.

Figure 3:
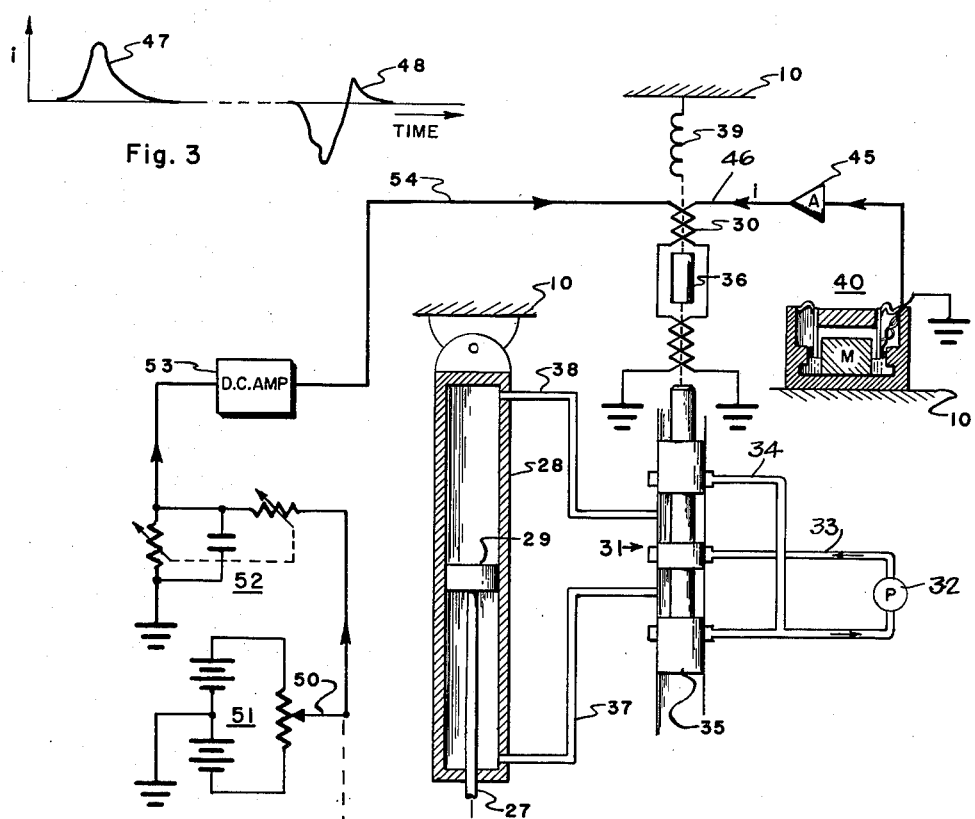
FIG. 3 shows typical electric signals produced for actuating the compensating control system.

The arrangement for moving the valve element 35 to control the position of the pulley 25 so as to compensate for sudden changes in altitude of the aircraft 10 as shown in FIG. 2 comprises an accelerometer 40 of known type for sensing transient accelerations of the aircraft 10 in a vertical direction and providing a corresponding output current which is amplified in an amplifier 45 and fed over a lead 46 to one of the windings of the solenoid 30. This output current has a polarity, amplitude and duration representative of the corresponding parameters of the transient acceleration of the aircraft 10. In FIG. 3, the curve 47 represents the current output of the accelerometer 40 caused by a sudden increase in altitude from one stable level to another stable level while the curve 48 represents the current caused by a sudden decrease in altitude followed by an increase in altitude of less magnitude to a stable level below the original level but above the lowest altitude attained. The accelerometer 40 is preferably damped or otherwise constructed to have a time constant of the order of ½ second.

After each compensating movement of the piston 29, it should be returned to its mid position so as to have future capability equal in either direction. For this purpose a part movable with the piston 29 such as the lever arm 24 is coupled to impart corresponding movement to the movable contact 50 of a potentiometer or voltage divider 51 to produce an error signal which after passing through and RC network 52 and a D.C. amplifier 53 is fed over a lead 54 to the other of the windings in the solenoid 30. This error signal has a polarity and magnitude representing the direction and amount of displacement of the piston 29 from its mid position and actuates the valve 31 until the error signal is nulled. Simultaneously with the nulling action just described, the servo amplifier 19 is energized through the cable 11 so that the reel 15 is rotated to change the length of the cable 11 compatible with such nulling action to the end that the device 12 is maintained with the separation h at the desired value. In order that the servo system actuating the reel 15 may keep pace with the nulling action of the potentiometer 51, ganged valved resistors in the RC circuit 52 are provided to adjust its time constant to a suitable value such as for example to the order of 3 seconds. This relatively long time constant prevents the nulling action of the potentiometer from appreciably affecting the compensating action by the accelerometer 40.

It will be evident that the foregoing arrangement for stabilizing the position of the device 12 is functionally indifferent to any instrumentation, for example a television camera, packed therewith, such being indicated by a streamlined vehicle 49, shown in broken lines, making it suitable for slow speed towing as well as hovering by the aircraft 10.

In the modification illustrated in FIG. 4, the lever arm 24 is dispensed with and the pulley 25 is free to move to aline the hydraulic cylinder 28 with the drag forces on the cable 11. With this arrangement and with the same stroke as in FIG. 2 for the piston 29, it is possible to compensate for substantially twice the amount of vertical displacement of the aircraft 10.

When the reference plane is other than the earth and is subject to sudden vertical accelerations such as the deck of a ship in a rough sea, the output of the sonic fathometer may be fed through a rate of change circuit to control the valve 31 to provide the desired compensating action.

It is to be understood that the pilot can at any time take over control of the reel 15 for any reason such as in the final phase of soft-landing or the initial phase of off-loading a suspended object. Such overriding controls are so well known as not to require illustration.

While for the purpose of disclosing the invention preferred embodiments have been described, it will be obvious to those skilled in this art that the novel features may be incorporated in a variety of embodiments without departing from the scope of the invention pointed out in the appended claims.

What is claimed is:

1. In combination with a rotary wing aircraft having object suspension means operative to maintain an object suspended from the aircraft at a selected vertical separation from a reference plane and including a cable with the object attached thereto wound on a reel and a drive for said reel for moving said cable into and out of the aircraft, a dance pulley over which said cable is trained, a hydraulic cylinder operably connected between the aircraft and said pulley for changing the elevation of said pulley to thereby change the effective length of said cable between the aircraft and the object suspended thereby, a control valve for said cylinder, and means responsive to transient vertical acceleration of the aircraft operative to so control said valve that said pulley is moved in the direction opposite to the direction of the vertical acceleration.

2. The combination in accordance with claim 1 wherein said pulley is journaled in the free end of a lever arm pivoted at its other end for rotation about an axis which is coaxial with said reel.

3. The combination in accordance with claim 1 including means for producing a control error signal having a characteristic representing the sense and magnitude of the movement of said pulley from its mid-position, and means including a time delay circuit utilizing said control error signal to control said valve until said control error signal is nulled.

4. The combination in accordance with claim 1 wherein said hydraulic cylinder is pendulously supported by said aircraft at a point substantially on the vertical which is above the dance pulley.

5. In combination a platform subject to vertical displacement, cable means for suspending an object from said platform, and means for stabilizing the vertical position of said object with respect to a reference plane, a reel mounted on said platform and carrying said cable, a motor for rotating said reel to take up and unwind said cable, means included in the suspended object for sensing its vertical separation from said reference plane and producing a control error signal having a characteristic representing the sense and magnitude of the variance between the vertical separation sensed and a preselected vertical separation, and a servomechanism including said motor utilizing said control error signal to rotate said reel until said control error signal is nulled.

6. The combination described in claim 5 including means for sensing and producing a signal representative of transient vertical accelerations of said platform, and means independent of said reel movable from a neutral position in response to said vertical acceleration signal for varying the effective length of said suspending cable in a manner tending to stabilize the vertical position of said object.

7. The combination described in claim 6 including means for producing an error voltage representative of the length varying movement of said independent means, and a servosystem for nulling said error voltage to return said independent means to its neutral position.

References Cited in the file of this patent
UNITED STATES PATENTS

| | | |
|---|---|---|
| 2,650,046 | Vanderlip | Aug. 25, 1953 |
| 2,873,075 | Mooers et al. | Feb. 10, 1959 |